US006625959B2

(12) United States Patent
Gordon et al.

(10) Patent No.: US 6,625,959 B2
(45) Date of Patent: Sep. 30, 2003

(54) CENTER COLUMN SUPPORT PACKAGING DEVICE FOR DISC-SHAPED ITEMS AND RELATED MATERIALS AND METHOD FOR PACKAGING SUCH DISKS AND MATERIAL

(75) Inventors: Alexandra Gordon, Bedford, NY (US); Charles W. Grimes, Darien, CT (US)

(73) Assignee: Avecmedia, Inc., Norwlak, CT (US)

( * ) Notice: Subject to any disclaimer, the term of this patent is extended or adjusted under 35 U.S.C. 154(b) by 60 days.

(21) Appl. No.: 09/917,317

(22) Filed: Jul. 28, 2001

(65) Prior Publication Data

US 2002/0020639 A1 Feb. 21, 2002

Related U.S. Application Data

(60) Continuation-in-part of application No. 09/627,594, filed on Jul. 28, 2000, now Pat. No. 6,330,943, which is a division of application No. 09/161,064, filed on Sep. 25, 1998, now Pat. No. 6,216,857.

(51) Int. Cl.[7] .......................... B65D 85/28; B65D 85/57
(52) U.S. Cl. ........................ 53/471; 206/214; 206/232; 206/308.1
(58) Field of Search .................. 53/471, 474; 206/214, 206/217, 232, 303, 307, 307.1, 308.1, 310, 371, 423, 224; 211/69.5; 215/6, 227; 220/4.26, 4.27, 501, 503, 521, 522, 660

(56) References Cited

U.S. PATENT DOCUMENTS 1,464,827 A * 8/1923 Morrison ..................... 206/309
1,940,088 A * 12/1933 Harrison ..................... 206/309
2,020,381 A * 11/1935 Labowitz et al. ........... 206/309
3,047,199 A * 7/1962 McBain ....................... 220/521
3,103,224 A * 9/1963 Dearling ..................... 220/521
3,225,805 A * 12/1965 Wise ........................... 206/423
4,078,686 A * 3/1978 Karesh .......................... 215/6
4,522,298 A * 6/1985 Weinberger ................. 220/522
4,535,888 A * 8/1985 Nusselder ................. 206/308.1
4,756,424 A * 7/1988 Schwartz ....................... 215/6
5,076,444 A * 12/1991 Syms ......................... 211/69.5
5,284,243 A * 2/1994 Gelardi et al. ........... 206/308.1
5,542,531 A * 8/1996 Yeung ...................... 206/308.1
5,697,498 A * 12/1997 Weisburn et al. ......... 206/308.1
5,816,394 A * 10/1998 O'Brien et al. .......... 206/308.1
5,819,929 A * 10/1998 Chen ........................ 206/308.1
6,070,752 A * 6/2000 Nava et al. ................. 220/521

* cited by examiner

Primary Examiner—Jim Foster
(74) Attorney, Agent, or Firm—Grimes & Battersby, LLP; Gregory J. Battersby; James G. Coplit

(57) ABSTRACT

A packaging device is provided for packaging at least one disc-shaped item such as a recording media together with other materials in a stacked relationship. The packaging device comprises a first member having a center column for its upper portion and a means for receiving and retaining the other materials as its lower portion, which first member is slidably inserted through the opening of and into the chamber of an elongated second member. A cover is provided to close the opening of the second member, thereby sealing the contents of both members. A central support structure for the disc media acts in combination with the annular opening at the center of the disc media so as to allow the disc media to rotate, while limiting the linear movement of the disc media. A method is further provided for packaging such disc-shaped item and other material within the packaging device.

28 Claims, 13 Drawing Sheets

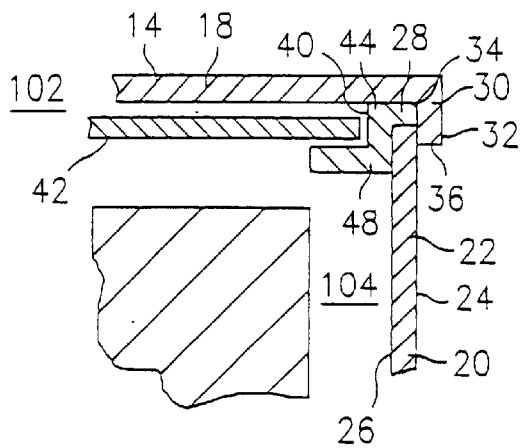
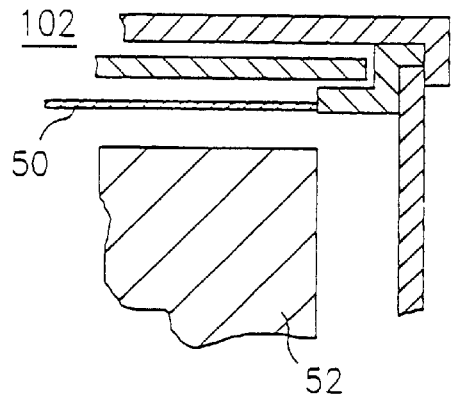
FIG. 2           FIG. 2A
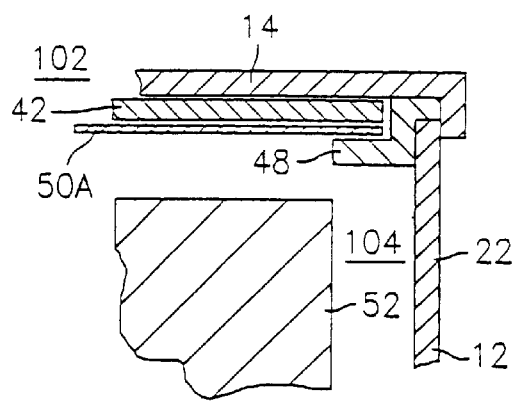
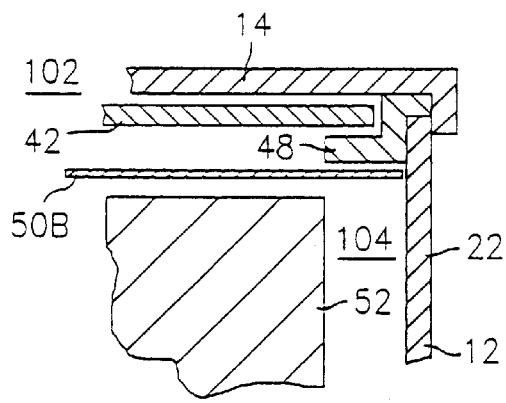
FIG. 2B           FIG. 2C

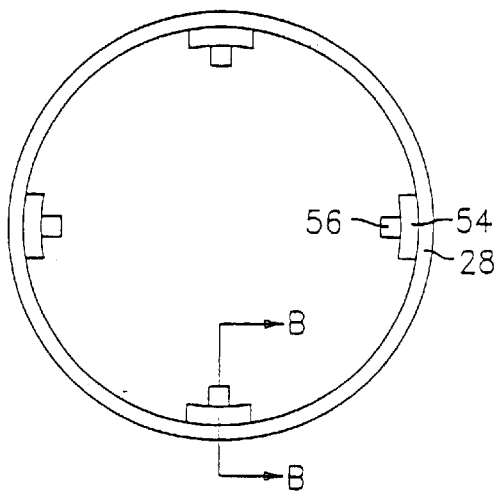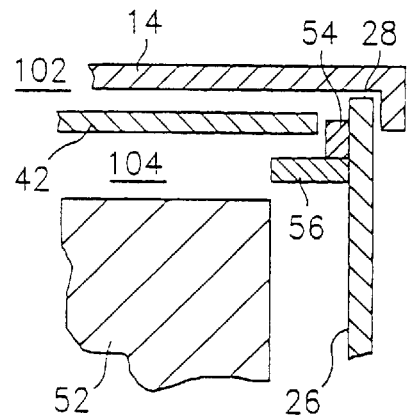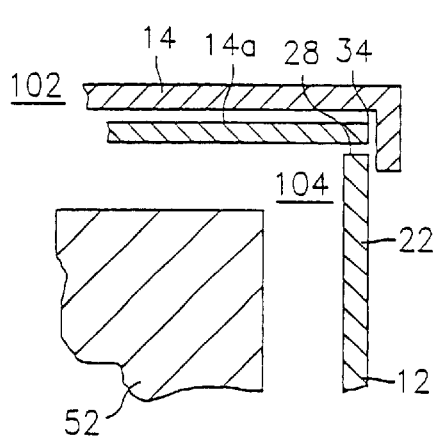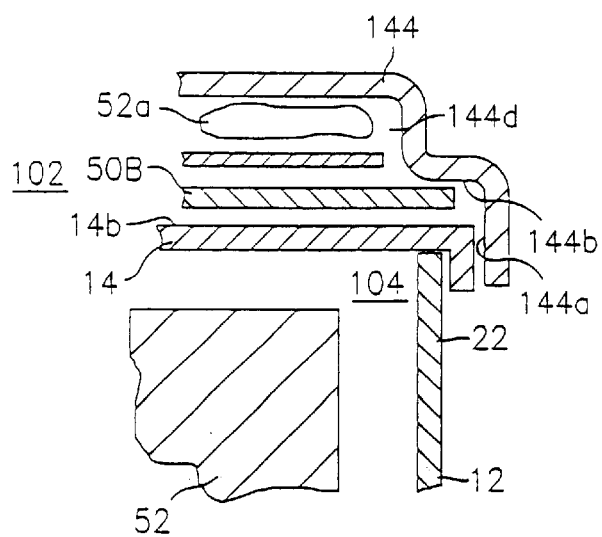
FIG. 3
FIG. 3A
FIG. 3B
FIG. 3C

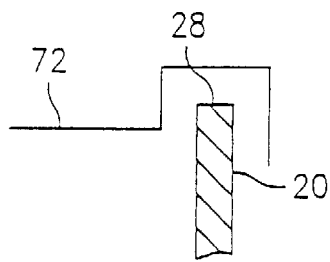 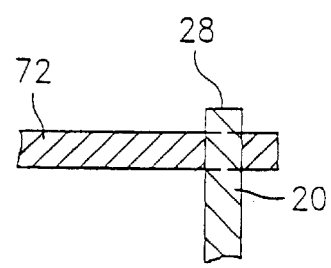
*FIG. 6A*  *FIG. 6B*
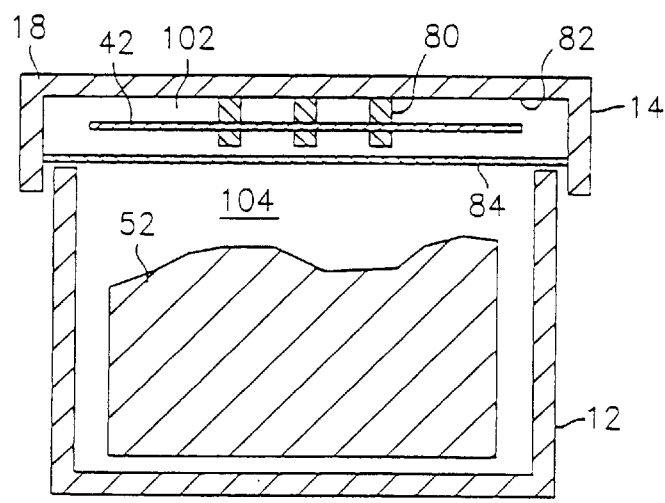
*FIG. 7*
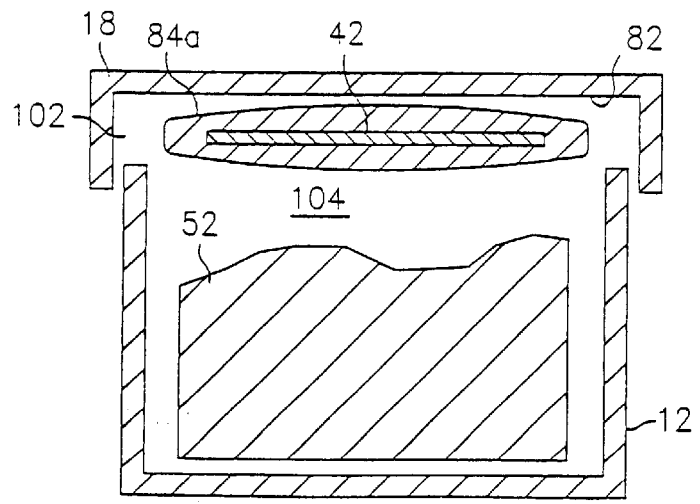
*FIG. 7A*

SECTION A-A

US 6,625,959 B2

CENTER COLUMN SUPPORT PACKAGING DEVICE FOR DISC-SHAPED ITEMS AND RELATED MATERIALS AND METHOD FOR PACKAGING SUCH DISKS AND MATERIAL

RELATED APPLICATIONS

This is a continuation-in-part of co-pending U.S. patent application Ser. No. 09/627,594 filed on Jul. 28, 2000 in the names of Alexandra Gordon and Charles W. Grimes for "Packaging Device for Disc-Shaped Items and Related Materials and Method for Packaging Such Disks and Material", now U.S. Pat. No. 6,330,943 which, in turn, was a divisional of co-pending U.S. patent application Ser. No. 09/161,064 filed on Sep. 25, 1998 in the names of Alexandra Gordon and Charles W. Grimes for "Packaging Device for Disc-Shaped Items and Related Materials and Method for Packaging Such Disks and Material", now U.S. Pat. No. 6,216,857.

BACKGROUND OF THE INVENTION

1. Field of the Invention

This invention relates, in general, to a device for packaging and displaying a circular or disc-shaped media and other materials and a method for packaging such disc-shaped media and other materials and, in particular, to containers and methods for initially packaging and thereafter repeatedly storing disc-shaped media together with or without other materials.

Still more particularly the present invention relates to a new and improved container for initially packaging and thereafter repeated storing of disc-shaped media and other materials in stacked relationship, having a first chamber adapted to be slidably inserted within a second chamber for respectively receiving and securely retaining the disc media and the other materials.

Still more particularly the present invention further relates to a new and improved system and method for initially packaging and thereafter repeated storing of media and other materials in stacked relationship, wherein a first container having a center column for its upper portion and a means for receiving and retaining materials other than the disc-shaped item as its lower portion is slidably inserted within an elongated second container. A cover is also provided to close the opening to the second container, thereby sealing the contents of both the first and second containers. The disc-shaped media is releasably retained within either the first container or the cover in a manner that the media is permitted to move rotationally while being limited in linear movement both perpendicularly and parallel to the plane of the media, and the other materials are placed inside an open ended second container or in the means for receiving and retaining on the lower portion of the first container. The first container is then inserted into the second container through the open end, and then cover is then releasably attached to the second container.

2. Background of the Invention

Packaging and storage devices for media are generally known. Disc-shaped media, such as CD's, DVD's or CD-ROM's, encounter special problems in handling, packaging and storage due to their delicate, flat recorded surfaces. Such disc media is generally sold in plastic cases which are sometimes referred to as "jewel boxes." Such cases are generally rectangular and have a mounting hub for holding the disc media by its center aperture. Such cases are usually kept after purchase of the disc media and utilized for re-packaging of the disc media between usage. Such jewel boxes are impractical packaging containers for shipping because of their small dimensions and easy breakage, and they thus require substantial additional packaging material or placement in larger shipping containers.

Disc media is routinely sold with other materials (whether directly related to the content of the disc media, i.e., ancillary, or otherwise). At the present time, disc media in such "jewel boxes" is commonly packaged together with ancillary materials in larger rectangular shaped cardboard boxes for shipping, sale and packaging. The "jewel boxes" are necessary to reliably protect the disc media from contact with the ancillary materials in the larger cardboard boxes. Such plastic case/cardboard box combination package arrangements are not only expensive, they also do not lend themselves to easy and secure repeated re-storage of the disc media and ancillary materials. They are often damaged during initial opening and repeated re-storage. They are often unable after initial opening to securely re-store the disc media (in the jewel box) and the other materials together in the cardboard packaging in a manner to preclude contact with each other. They frequently become unsightly after initial opening and repeated re-storage. They are, themselves, difficult to handle and store.

Other types of packaging and storage devices are needed to organize, protect, ship, display at retail and store disc media sold and/or shipped in combination with ancillary materials.

A need also exists for devices which can effectively and efficiently organize, protect, ship, display at retail and store disc shaped media with other materials.

An opportunity exists that is not being commercially exploited at the present time to distribute disc-shaped recording media with materials that are either ancillary or wholly unrelated to the content of the disc media. This opportunity arises for product manufacturers who wish to deliver disc-shaped media with a collection of loose items used while watching the media, e.g., toy companies, arts and crafts companies, hobby companies, game companies, cosmetic companies, food companies (e.g., collections of spices or seasonings), kitchen and other utensil manufacturers (e.g., collections of baking or carving tools), sporting goods manufacturers (e.g., a set of gun cleaning tools or fishing lure tying equipment), machine tool manufacturers (e.g., a complete set of adjusting wrenches, bits, etc.), and the list goes on and on. This opportunity also arises in connection with delivery of purchases to catalog, e-commerce, and other "shop-at-home" customers, as well as for the distribution of free-standing-insert type advertising, samples, business-to-business communications and other forms of direct marketing and retail sales. This opportunity is not being exploited due to the lack of an effective container design and method for efficiently organizing, protecting, shipping, displaying at retail and storing disc-shaped media packaged with other materials.

SUMMARY OF THE INVENTION

A primary object of this invention is to provide a container in which and a method whereby disc-shaped media and ancillary materials can initially be packaged together in stacked relationship and, after removal and use, they can easily be re-stored in stacked relationship in a manner so as to avoid contact therebetween.

Another object of this invention is to provide a container and a method of packaging that eliminates the need for a separate case (i.e., the need for a "jewel box") for the disc media.

Yet another object of this invention is to provide a container and a method of packaging whereby during initial storage, shipping, retail presentation and re-packaging disc media is securely held against movement and protected.

Still another object of this invention is to provide a shipping container in which and a method of packaging whereby disc-shaped media and other materials can be attractively, efficiently, and effectively packaged, presented, conveyed, distributed and stored.

Another important object of this invention is to provide an aesthetically unique and compelling device and method for presenting at retail disc-shaped media and other materials which may or may not be related to the content of the media.

But another object of this invention is to provide a container and a method of packaging including a first member adapted to be slidably inserted into a second member, said first member including means to receive and retain materials other than said disc-shaped media and, in a preferred embodiment, the disc-shaped media as well.

Yet still another object of this invention is to provide a container and a method of packaging including a first member adapted to be slidably inserted into a second member then sealed by a cover, said cover including means to receive and retain the disc-shaped media and said first member and second member both including means to receive and retain materials other than said disc-shaped media.

Another object of this invention is to provide a container and a method of packaging whereby the container has a removable lid that attaches to the container after the disc media has been either initially positioned or subsequently re-stored on a seat on the lid that retains the disc media against movement in a second, opposite direction perpendicular to the plane of the disc media.

Yet another object of this invention is to provide a container and a method of packaging whereby the first member and lid are removable and the first member can be removed to access materials other than the disc-shaped media being stored in the second member beneath the first member.

Another object of this invention is to provide a container and a method of packaging whereby an annular ring or protrusion mounted on either the cover or the column of the first member of the container defines an annular post slightly smaller in exterior diameter than the diameter of the center hole of the disc media to thus retain the disc media on the post in the first chamber of the first member of the container against movement in the plane of the disc media.

Still another object of this invention is to provide a container and a method of packaging whereby the first member includes means for grasping said first member in order to facilitate removing and replacing said first member from the container.

Yet another object of this invention is to provide a container and a method of packaging whereby the annular post adapted to hold the disc media includes at least one protrusion adapted to retain said disc media in place on said annular post once said disc media has been snapped in place over said protrusion.

But another object of this invention is to provide a container and method of packaging whereby the support member is a center post fixedly attached to and extending from the inside center of the lid.

To accomplish these and other objects, the container of this invention in its preferred form comprises a first member having a center column for its upper portion and a means for receiving and retaining materials other than the disc-shaped item in its lower portion, which first member is slidably inserted through the opening of and into the chamber of an elongated second member. A cover is provided to close the opening of the second member after insertion of the first member, thereby sealing the contents of both the first and second members. The disc-shaped media is releasably retained either by the first member or the cover such that the media is permitted to move rotationally while being limited in linear movement both perpendicularly and parallel to the plane of the media. Materials other than the disc-shaped media may be placed into the chamber of the second member or, alternatively, into the means for receiving and retaining disposed in the lower portion of the first member. The first member is inserted into the second member and into the chamber therein through the opening, and then cover is then releasably attached to the second member. In the preferred embodiment, a means for grasping the first member is disposed either on the sides or at the top of the column so as to allow a user to more easily remove the first member from the chamber in the second member, and thereafter replace same. A central support structure for the disc media is provided on either the cover or at the top of the column of the first member, which center support acts in combination with the annular opening at the center of the disc media, so as to allow the disc media to rotate, while limiting the linear movement of the disc media both perpendicular to and parallel to the plane of the media. The central support structure in the preferred form includes at least one projection which extends from either the inner surface of the cover or the top of the column, which projection provides secure support for the disc shaped media in either the lid or the column. In the preferred embodiment, at least one protrusion is disposed on said projection, which protrusion further serves to retain said disc-shaped media upon the projection, once the disc-shaped media has been snapped in place over said protrusion. Once the disc media has been placed on the support structure, the cover is then engaged with and secured to the second member, thereby closing and sealing the opening.

In the preferred method of packaging, materials other than the disc media are inserted into the chamber of the second member or within the means for receiving and retaining disposed in the lower portion of the first member. The disc media is then inserted into and releasably retained about the central support structure on either the top of the column on the first member or on the inner surface of the cover. The first member is slidably inserted into the chamber of the second member, and the cover is then attached about the opening of the second member such that it serves to close and seal the opening to the chamber in the second member.

The above, as well as additional objects, features and advantages of the invention will become apparent in the following detailed description.

BRIEF DESCRIPTION OF THE DRAWINGS

The novel features believed characteristic of the invention are set forth in the appended claims. The invention itself, however, as well as the preferred mode of use, further objects and advantages thereof, will best be understood by reference to the following detailed description of illustrative embodiment when read in conjunction with the accompanying drawings, wherein:

FIG. 2 is a cut-away, cross-sectional side view of a portion of the novel disc packaging device of FIG. 1 when the lid is on the container, along line AA illustrating the resultant first and second chambers thereof;

FIG. 2A is an alternative embodiment of the device shown in FIG. 2, wherein a protective element is inserted between the first and second chambers;

FIG. 2B is an alternative embodiment of the device shown in FIG. 2A, showing an alternative method of insertion of the protective element between the first and second chambers;

FIG. 2C is a further alternative embodiment of the device shown in FIG. 2A, showing, a further alternative method of insertion of the protective element between the first and second chambers;

FIG. 3 is a top plan view of the novel disc packaging device of the present invention illustrating the alternative use of abutments and protrusions affixed to the inside wall of the container;

FIG. 3A is a cut-away, cross-sectional side view of a portion of the device shown in FIG. 3, along line B—B, with a disc media and other materials inserted and the lid affixed;

FIG. 3B is a cut-away, cross-sectional side view of an alternative embodiment of the novel disc packaging device of the present invention illustrating the alternative use of the upstanding rim of the base and the inside wall of the cover in place of the abutments and protrusions of FIG. 3;

FIG. 3C is a cut-away, cross-sectional side view of an alternative embodiment of the novel disc packaging device of the present invention illustrating the alternative use of the outer surface of the cover and the inner surface of a supplementary cover in place of the abutments and protrusions of FIG. 3;

FIG. 6A and 6B are cross-sectional views of alternate embodiments of the packaging device of the present invention depicting two different methods of mounting the disc media support member to the device outer wall;

FIG. 7 is a cut-away, cross-sectional side view of an alternative embodiment of the present invention with disc media and other materials inserted, the protective element inserted and the lid closed, which the first chamber in which the disc media is stored is in the cover;

FIG. 7A is a cut-away, cross-sectional side view of an alternative embodiment of the device shown in FIG. 7, wherein the disc media is inserted into a protective envelope that is affixed to the inner surface of the cover;

DETAILED DESCRIPTION OF THE INVENTION

Figure 1:
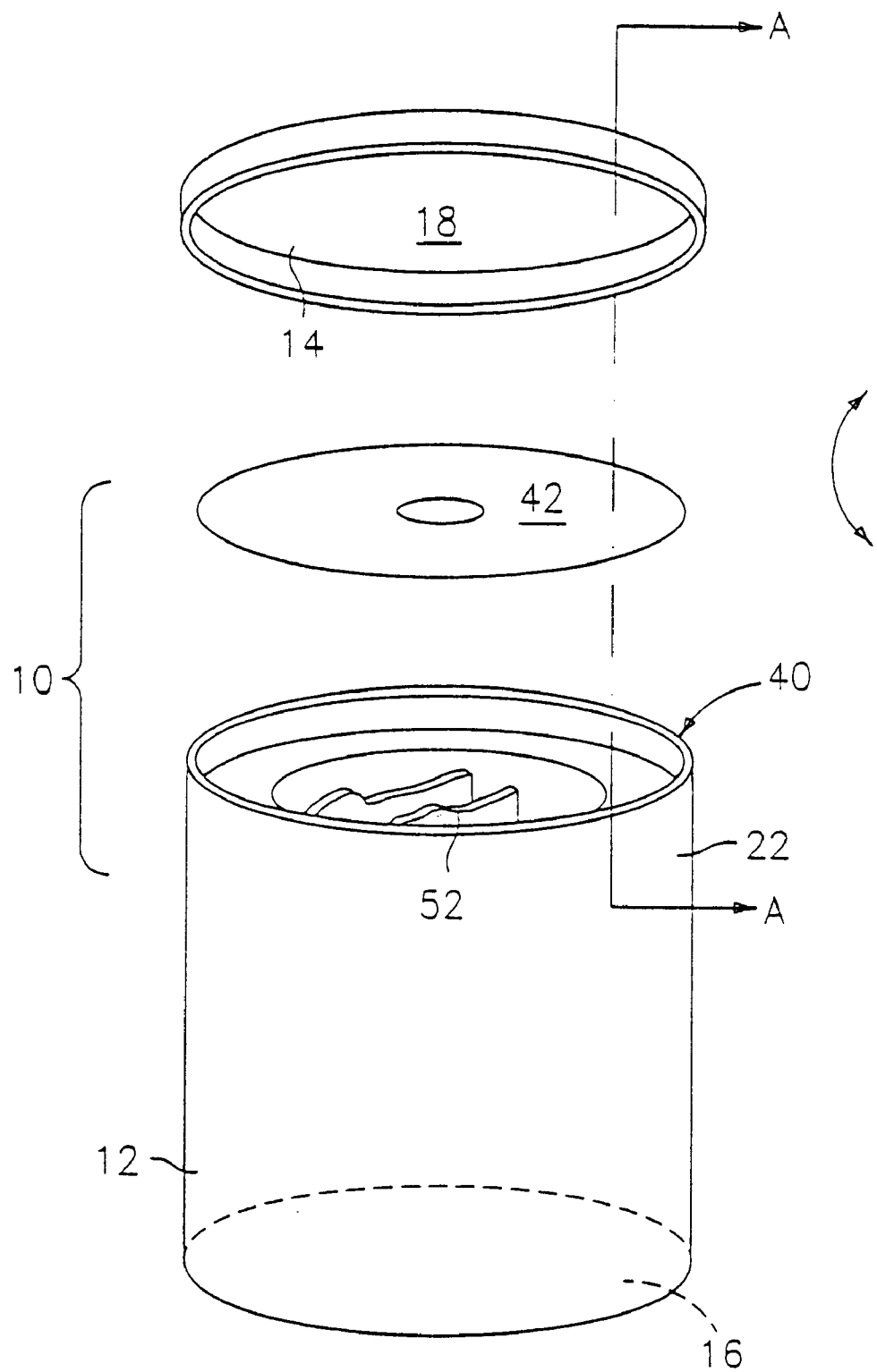
FIG. 1 is an exploded perspective view of the novel disc packaging device of the present invention with the lid and disk media removed, illustrating the use of a one-piece annular collar member with an annular ring and lip.

With reference now to the figures and in particular with reference to FIG. 1, there is shown a front view of the disc packaging device 10 of the present invention. As illustrated, disc packaging device 10 includes a lower base component or container 12 and an upper cover component or lid 14. Lower base component 12 and upper cover component 14 are utilized to form a generally cylindrical packaging device of dimension slightly larger than the disc shaped recording media to be stored. End plates 16 and 18 cooperate with lower base component 12 and upper cover component 14 to fully enclose the cylindrical packaging space defined thereby.

The lower base component 12 of the embodiment of this invention shown in FIGS. 1 and 2 includes a side wall 20. The side wall can be constructed from either cardboard (i.e., natural fiber material) or plastic (i.e., man-made synthetic material) or other material suitably rigid for the base component to retain its shape, including metal, e.g., as in a vacuum sealed, canned product.

The base component 12 can be designed to threadably receive the bottom plate 16 which is of conventional design, made of stiff cardboard, plastic, metal or some similarly rigid material and used as a cover-all screw cap on a very wide variety of containers. Alternatively the bottom plate 16 can nest inside the side wall 20 where it is held by friction, stapling, gluing or some other means. The side wall 20 has an upper section 22 and the upper section 22 can be threaded to accommodate the upper cover component 14 although in the embodiment shown in FIGS. 1 and 2 the cover is made of plastic and snaps on in a conventional manner.

As best seen in FIG. 2, the upper section 22 is defined by an outer wall 24, an inner wall 26 and a rim 28. The cover component 14 has a side wall 30 defined by an outer wall 32, an inner wall 34 and a rim 36. The diameter of the inner wall 34 of the cover component is slightly greater than the diameter of the outer wall 24 of the base component. In the embodiment shown in FIGS. 1 and 2, there is an inner structure 40 which provides circumferential support for a disc shaped media 42 stored within the packaging device 10. The structure 40 comprises an annular collar 44 having an annular ring 46 and an annular lip 48. The inner structure 40 nests within the lower base component 12. The annular collar 44 has an outer diameter greater than the diameter of the inner wall 26 of the base component such that the annular collar extends beyond the inner wall 26 and sits on top of the base rim 28. The annular ring 46 has an outer diameter less than the diameter of the inner wall 26, such that the annular ring nests inside the inner wall 26. The annular lip 48 has an inner diameter less than the outer diameter of the disc shaped media 42. Thus, the disc shaped media will rest on the annular lip, inside the annular ring. In this way, movement of the disc shaped media in the plane of the disc shaped media is precluded by the annular abutment 46. Movement of the disc shaped media perpendicular to its plane is prevented in one direction by the annular lip 48. When the cover component 14 is affixed to the base component 12, the cover plate 18 acts to preclude movement of the disc shaped media in the opposite perpendicular direction to the plane of the disc shaped media.

In the embodiment disclosed in FIG. 2A, a protective member 50 is attached to the annular lip 48. The protective member can be made of plastic film or any other conventional material to provide a barrier between the disc shaped media and other materials 52 which can be stored in the base component 12 of the packaging device 10. The protective member can be permanently affixed to the annular lip or it can be affixed at the time of assembly and shipment and removed by the consumer after purchase, i.e., at a time when further "rough handling" that would cause interaction between the disc shaped media and the other materials is less likely to occur.

In an alternative embodiment disclosed in FIG. 2B, the protective element is removable and sized to seat on the annular lip 48 between the annular lip 48 and the disc shaped media. The protective element is round like the disc shaped media and has a central opening into which one's finger can be inserted to engage, lift and remove the protective element and subsequently engage, lift and replace the protective element.

In an alternative embodiment disclosed in FIG. 2C, the protective element 50B is flexible and is removably inserted within the lower base component beneath the annular lip 48 and on top of the other materials 52 placed therein. The protective element is sized to correspond to the interior wall 26 and has a central opening into which one's finger can be inserted to engage, lift and remove the protective element and subsequently engage, lift and replace the protective element. Alternatively, the protective element can be provided with a lift tab or some other conventional means whereby it can be grabbed and removed.

In the alternative embodiment shown in FIGS. 3 and 3A, the inner structure 40 is modified. The annular collar 44 with annular ring 46 and annular lip 48 is replaced by discrete abutments 54 and discrete protrusions 56. Collectively, the abutments 54 and protrusions 56 are positioned within the lower base component 12 around the circumference of the inner wall 26 spaced below the rim 28, affixed to the inner wall 26, so as to perform the same function as the annular ring 46 and annular lip 48. Specifically, the abutments 54 preclude movement of the disc shaped media in the plane of the disc shaped media i.e., performing the same function as the annular ring 46. Similarly, the protrusions 56 are positioned about the inner wall 26 and collectively preclude movement of the disc shaped media in a direction perpendicular to plane of the disc shaped media i.e., performing the same function as the annular lip 48.

FIG. 3B shows a further alternative embodiment wherein the disc shaped media is seated on the rim 28 and movement of the disc shaped media perpendicular to its plane is prevented in one direction by the rim 28. When the cover 14 is affixed to the base component 12, movement of the disc shaped media in the plane of the disc shaped media is precluded by the inner wall 34 of the cover 14 and inner surface 14a of the cover 14 acts to preclude movement of the disc shaped media in the second, opposite perpendicular direction to the plane of the disc shaped media.

FIG. 3C shows a further alternative embodiment wherein the disc shaped media is seated on the outside surface 14b of the cover 14 and movement of the disc shaped media perpendicular to its plane is prevented in one direction by a supplementary cover 144 that snaps onto the cover 14. When the supplementary cover 144 is affixed to the cover 14, movement of the disc shaped media in the plane of the disc shaped media is precluded by the inner wall 144a of the supplementary cover 144 and the inner wall 144b of the supplementary cover 144 acts to preclude movement of the disc shaped media in the second, opposite perpendicular direction to the plane of the disc shaped media. The supplementary cover 144 can include a chamber 144d and a protective element 50b can be inserted to prevent contact between the disc shaped media and whatever materials 52a are placed in the chamber 144d.

Figure 4:
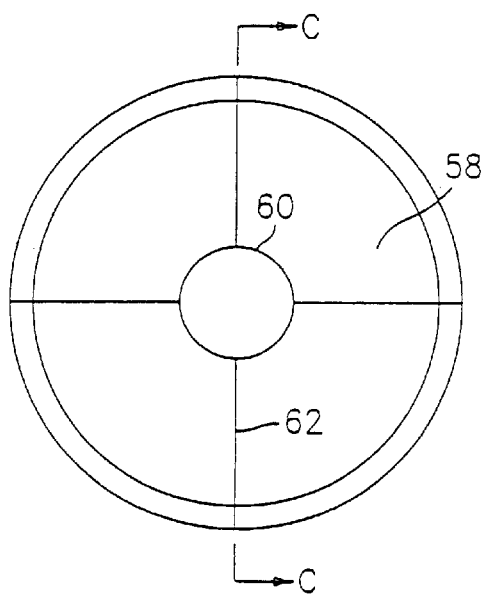
FIG. 4 is a top plan view of the novel disc packaging device of the present invention illustrating the alternative use of a center annular post support for the disc media suspended from spokes.
Figure 4A:
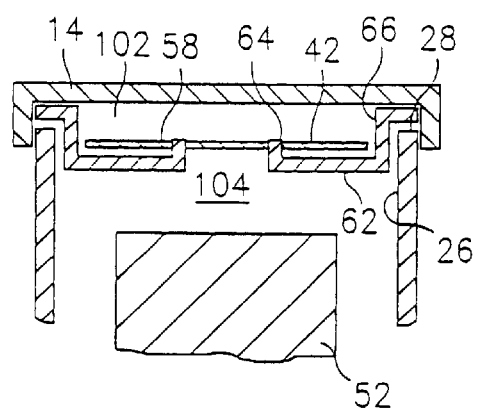
FIG. 4A is a cut-away, cross-sectional side view of the device shown in FIG, 4, along line C—C, with a disc media and other materials inserted and the lid affixed.

In the alternative embodiment seen in FIGS. 4 and 4A, the inner support structure 40 is replaced with an inner support structure 58 that provides center support for the disc shaped media as opposed to the circumferential support provided by inner structure 40. In the embodiment shown in FIGS. 4 and 4A, the alternative inner structure 58 includes an annular ring 60 and spokes 62 extending therefrom. As seen in FIG. 4A, the annular ring 60 has a raised portion 64 on which the disc media 42 sits, The spokes 62 each have a finger portion 66 which extends upwardly and outwardly such that when the structure 58 is inserted into the base component 12, the fingers 56 frictionally engage the inner wall 26 and sit on the upper rim 28. The structure 58 can include webbing between the fencers 56 (ala the webbing in a duck's foot) comprised of a thin material to provide protection for the disc shaped media 42 from the other materials 52. Inside the annular ring 60 would be left open to allow the consumer, after removing, the cover 14, to insert their finger into the annular ring and to thereby remove both the disc shaped media 42 and the structure 58.

Figure 5:
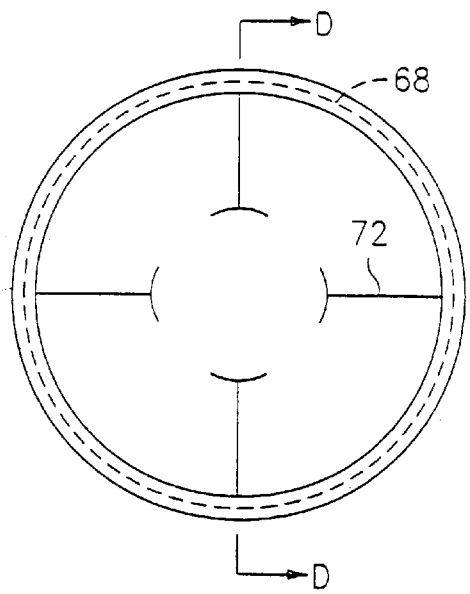
FIG. 5 is a top plan view of the novel disc packaging device of the present invention illustrating fingers that extend from a frame carried by the side wall of the container and that provide center support for the disc media.
Figure 5A:
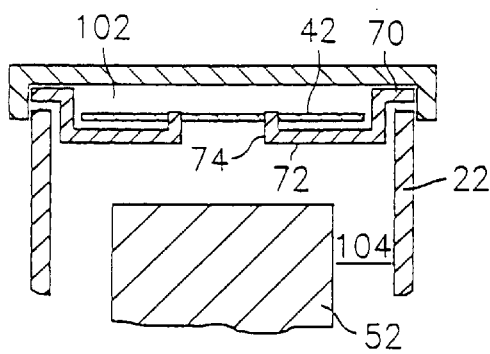
FIG. 5A is a cut-away, cross-sectional side view of the device shown in FIG. 5, alone, line D—D, with a disc media and other materials inserted and the lid affixed.

FIGS. 5 and 5A show a further alternative inner structure 68 comprising an annular collar 70 from which fingers 72 extend inwardly. At the ends of the fingers 72 are upstanding projections 74. The annular collar 70 nests inside the inner wall 26 and sits on the rim 28 in the same manner as the inner structure 40 in the embodiment shown in FIGS. 1 and 2. The upstanding projections 74 cooperate to provide a center support structure for the disc shaped media.

As seen in FIGS. 6A and 6B, the fingers 72 in the embodiment shown in FIGS. 5 and 5A do not necessarily need to be suspended from an annular collar. Alternatively, the could be clipped to the side wall 20 as seen in FIG. 6A or they could be screwed into the side wall 20 as shown in FIG. 6B.

In an alternative embodiment shown in FIG. 7, a center support structure is provided for the disc shaped media in the upper cover component 14. Specifically, projections 80 extend from the inside wall 82 of the end plate 18. These projections 80 cooperate to provide secure support for the disc shaped media in the cover component 14. A protective element 84 can be provided which is either removably nested within the cover as shown or which can be inserted at the time of manufacture and removed and discarded by the consumer after purchase. The cover 14 can engage the base component 12 in any variety Of conventional ways, e.g., snap on, telescope on, screw on, etc.

In a further alternative embodiment shown in FIG. 7A, the disc shaped media is encased within an envelope 84a made of plastic or some other suitable material and which is affixed to the inside wall 82 of the end plate 18. The envelope is either removably or permanently affixed, e.g., by gluing, with double-sided tape, or by other conventional means. The envelope can itself constitute a re-useable packaging container for the disc shaped media that either remains affixed to the plate 18 or can be removed from the plate 18, e.g., so that the cover 14 can be discarded. Or the disc shaped media can be packaged within a packaging sleeve (not shown) ail of which can then be inserted into the envelope and then removed from the envelope once the envelope is opened.

Figure 8:
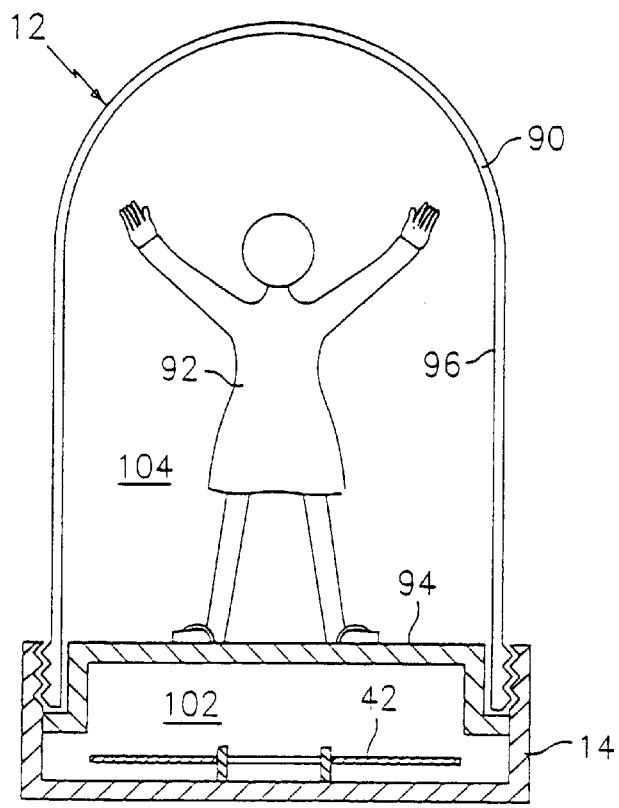
FIGS. 8 and 8A are side perspective, partially cut-away, cross-sectional views of alternative embodiments of the present invention, illustrating the use of the "lid" of the embodiment shown in FIG. 7 as the base, thereby allowing the portion of the invention defining the second chamber to be of an irregular shape (FIG. 8) or to have deformable construction (FIG. 8A)
Figure 8A:
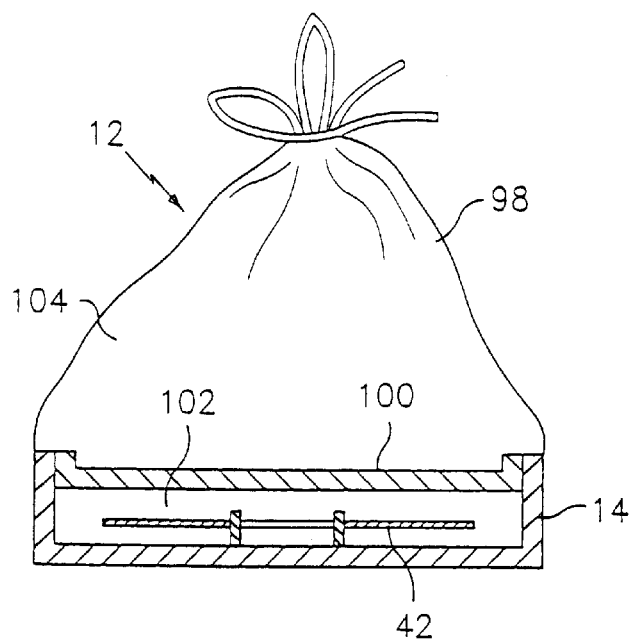

FIGS. 8 and 8A show further alternative embodiments of the present invention. In FIG. 8, the fact that the disc shaped media is stored within the cover component 14 allows for an alternative construction of the container 12. In this alternative embodiment, the cover 14 serves as the "base". The alternative base 90, in which the other materials, in this case, a doll 92, are stored, has an end wall structure 94 which frictionally encases the inner wall 96 and seals the chamber in the base 90. Alternatively, wall 94 can be provided with threads so that it will threadably engage corresponding threads on the inside wall 96. The cover 14 and base 90 can be attached in the same manner as heretofore been discussed in connection with other embodiments.

In the embodiment showing in FIG. 8A, the cover 14 once again carries the disc shaped media 42 and thereby allows the base 12 to be of a deformable construction 98. The deformable member 98 has a rigid internal support structure 100 which is designed to frictionally or threadably engage the cover 14.

Figure 9:
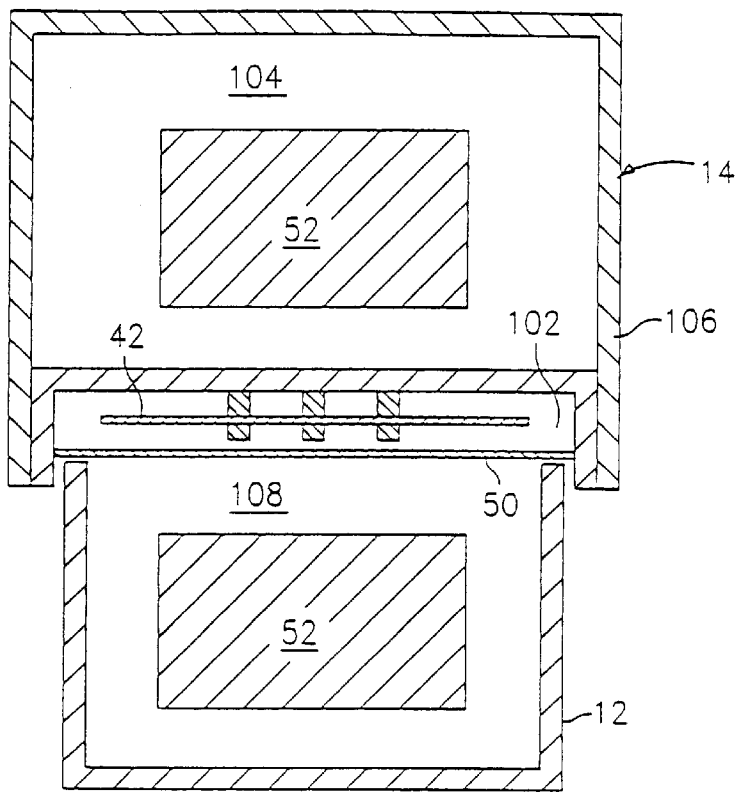
FIG. 9 is a cut-away, cross-sectional side view of an alternative embodiment of the present invention in which the disk media is located in the lid and the lid and the container include second and third chambers, respectively, for storing other material.
Figure 10:
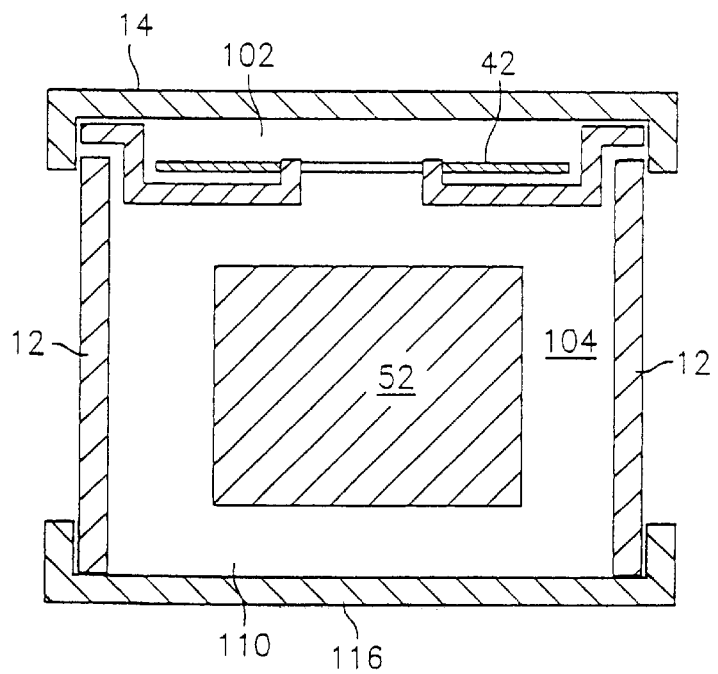
FIG. 10 is a cut-away, cross-sectional view of another embodiment of the present invention in which the second chamber in the container for storing other materials includes a second opening separate and distinct from the lid and a removable cover such that access to the second chamber can be attained without removing the lid.

In the alternate embodiment shown In FIG. 9, the disc shaped media is stored in a first chamber 102 in the lid 14 defined by an annular support 40 similar in construction to the embodiment of FIG. 7, except that the lid includes a second chamber 104 defined by an outer wall 106 for other materials and the base 12 includes a third chamber 108. In the alternate embodiment shown in FIG. 10, which is similar in construction to the embodiment of FIG. 4, there is provided an additional opening 110 in the container 22 and a cover 116 for closing the opening 110. The cover 116 can be removed to gain access to the chamber 104 without removing the cover 14.

Figure 11:
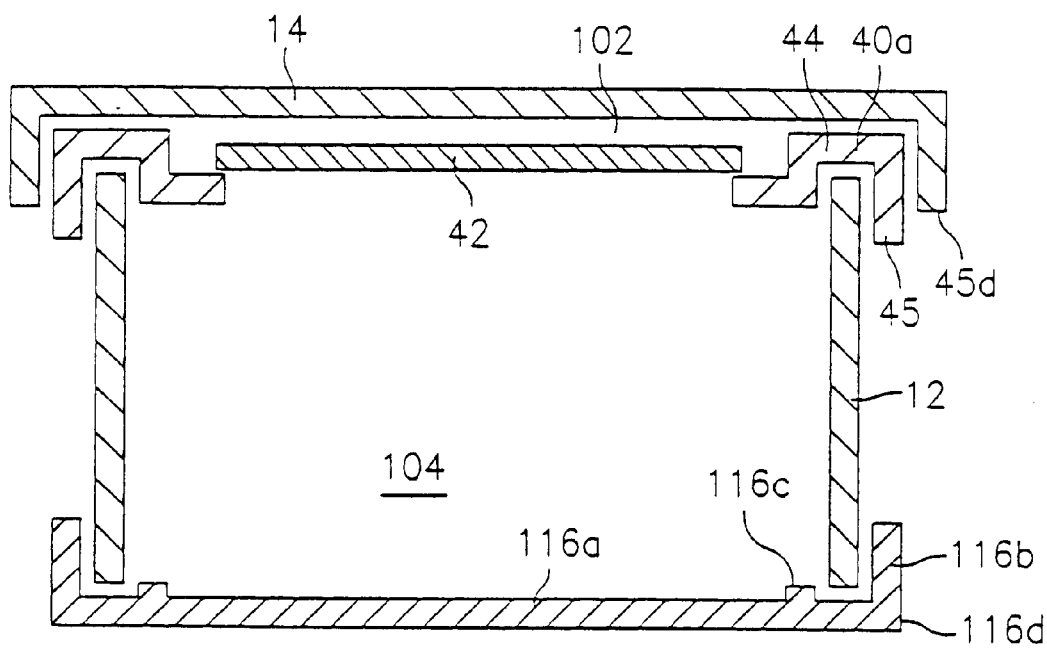
FIGS. 11 and 11A are cut-away, cross-sectional side views of another embodiment of the device shown in FIG. 10 in which the method of mounting shown in FIG. 6A is utilized and wherein the removable cover for the second chamber can be mated with the removable cover for the first chamber to form a mini-packaging device shown in FIG. 11A.
Figure 11A:
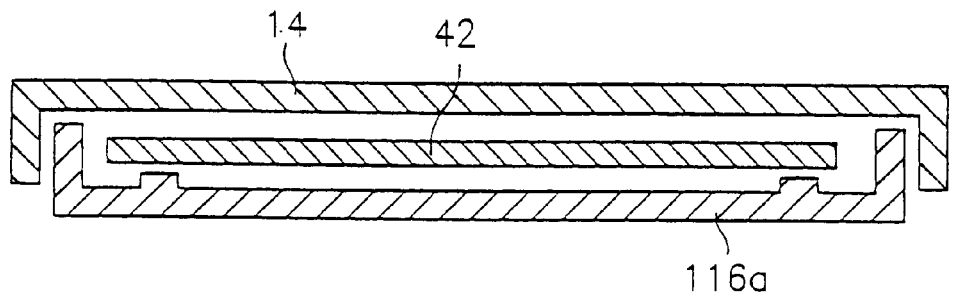

In the alternative embodiment shown in FIGS. 11 and 11A, an inner structure 40a is provided that is a slightly modified version of the inner structure 40 shown in FIG. 2, in that it includes an annular wall 45 that extends around the entire circumference of the annular collar 44 and engages the outer surface of the wall of the base 12, and the cover 14 is configured to engage not the base 12, but rather, the annular wall 45. An additional opening 110 is provided as in the embodiment of FIG. 10, and a cover 116a is provided that is a slightly modified version of the cover 116 of FIG. 10, in that it includes not only an outer annular wall 116b for engaging the outer surface of the wall of the base 12, but also an inner annular wall 116c for engaging the inner surface of the wall of the base 12. The circumferential dimension of the outer surface 116d of the wall 116b of the cover 116a is identical to the circumferential dimension of the outer surface 45d of the wall 45, such that the covers 14 and 116a can be removed and the cover 14 which matingly engaged the wall 45 will matingly engage the outer wall 116b of the cover 116a, as shown in FIG. 11A. In this way, as also shown in FIG. 11A, the covers 14 and 116a can be used together as a mini-packaging device for the disc shaped media 42. In the embodiment shown, the inner wall 116c helps to securely retain the disc shaped media against movement. However, it is understood that the benefits of the invention could be achieved without such inner wall, or utilizing one of the other retaining methods disclosed herein.

Figure 12:
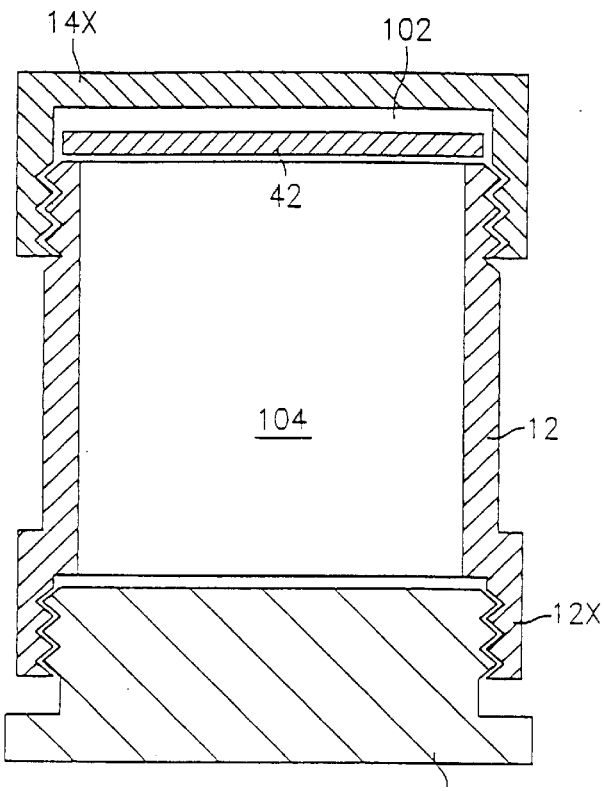
FIG. 12 is a cut-away, cross-sectional side view of an alternative embodiment of the device shown in FIGS. 11 and 11A in which the method shown in FIG. 3B for retaining the disc media is utilized and in which the two covers threadably engage the base and, when removed, can be threaded together to create a mini-packaging unit.

In the alternative embodiment shown in FIG. 12, the disc shaped media seats on the rim 28 as in the embodiment shown in FIG. 3B, but the cover 14x does not snap onto the base 12, but rather, threadably engages it. Furthermore, the bottom 12x of the base 12 is flared outwardly and contains internal threads that are of the same dimension as the internal threads of the cover 14x. The cover 116x includes mating external threads such that the cover 116x can be threaded into the flared bottom 12x of base 12. In this way, the covers 14x and 116x can be removed from the base 12 and threadably engaged to form a mini-packaging unit for the disc shaped media.

Figure 12A:
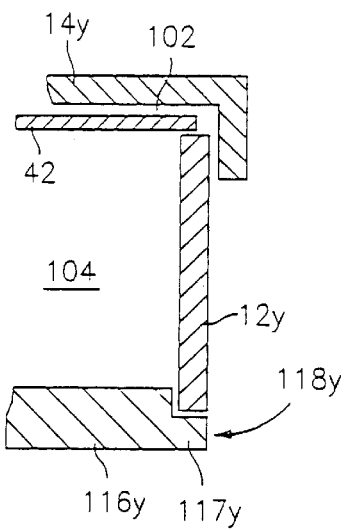
FIG. 12A and 12B are cut-away, cross-sectional side views of alternative embodiments of the device shown in FIG. 12, wherein the two covers slidably engage after removal (FIG. 12A) or threadably engage after removal (FIG. 12B)
Figure 12B:
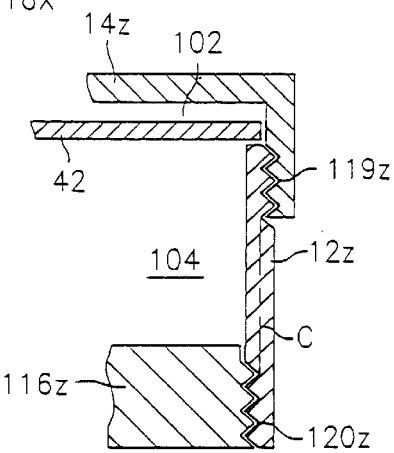

In the alternative embodiments of FIGS. 12A and 12B, the need to flare out the bottom of the base 12 is eliminated. In FIG. 12A, the base 12y receives a bottom cover 116y that includes an overlapping portion 117y, the outer surface 118y of which is of equal dimension to the outer surface 118y of which is of equal dimension to the outer wall of the base 12y, such that covers 14y and 11y can be slidably engaged to form a mini-storage unit for the disc media. In FIG. 12B, the base 12z has an external threaded portion 119z and an internal threaded portion 120z each of which extends beyond the center line "C" of the wall of the base 12z. In this way, when the covers 14z and 116z are removed, they can be threadably engaged to form a mini-storage unit for the disc media.

Figure 13:
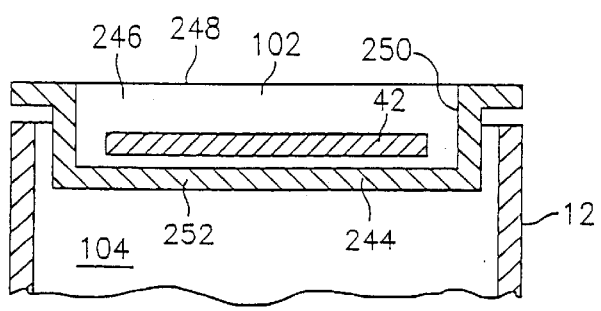
FIG. 13 is a cut-away, cross-sectional side view of another embodiment of the present invention in which a concave cavity on the exterior side of the cover for the device forms the first chamber for the disc media and a seal encloses the disc media within the concave cavity.

FIG. 13 shows a further alternative embodiment, wherein the cover 244 nestingly seats within the base 12 and the disc shaped media 42 is placed within the concave recess 246 of the cover 244. A seal 248 made of plastic or other suitable material is applied to the cover 244 to hold the disc shaped media within the cover 244 until the seal is removed by the user. The disc shaped media can be retained against movement within the cover 244 as a result of contact with the side walls 250, bottom wall 252 and seal 248, or by utilization of any of the other methods taught herein.

Figure 14:
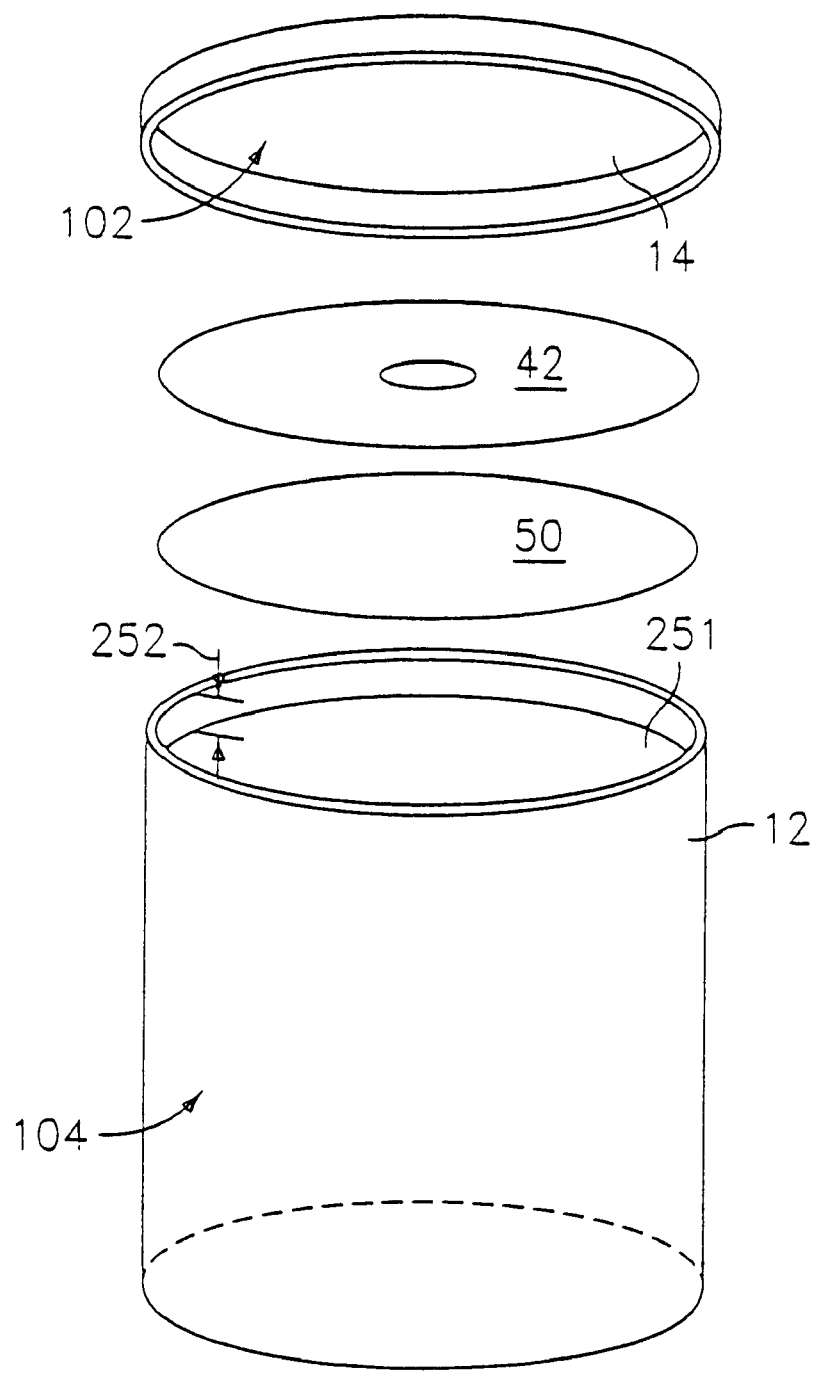
FIG. 14 is an exploded perspective view of a further alternative embodiment of the novel disc packaging device of the present invention with the lid, disk media and protective element removed, illustrating the use of a sealed base.

FIG. 14 shows a further alternative embodiment wherein the base 12 is a separately manufactured container of miscellaneous content, that includes a slightly concave end 251, the depth 252 of which exceeds the combined thickness of a disc shaped media 42 and a protective element 50 which are seated within the concave end 251 and held there by cover 14 which snaps onto base 12. In an alternate embodiment, a protective element is not used or the disc shaped media is packaged in an envelope (not shown).

Figure 15:
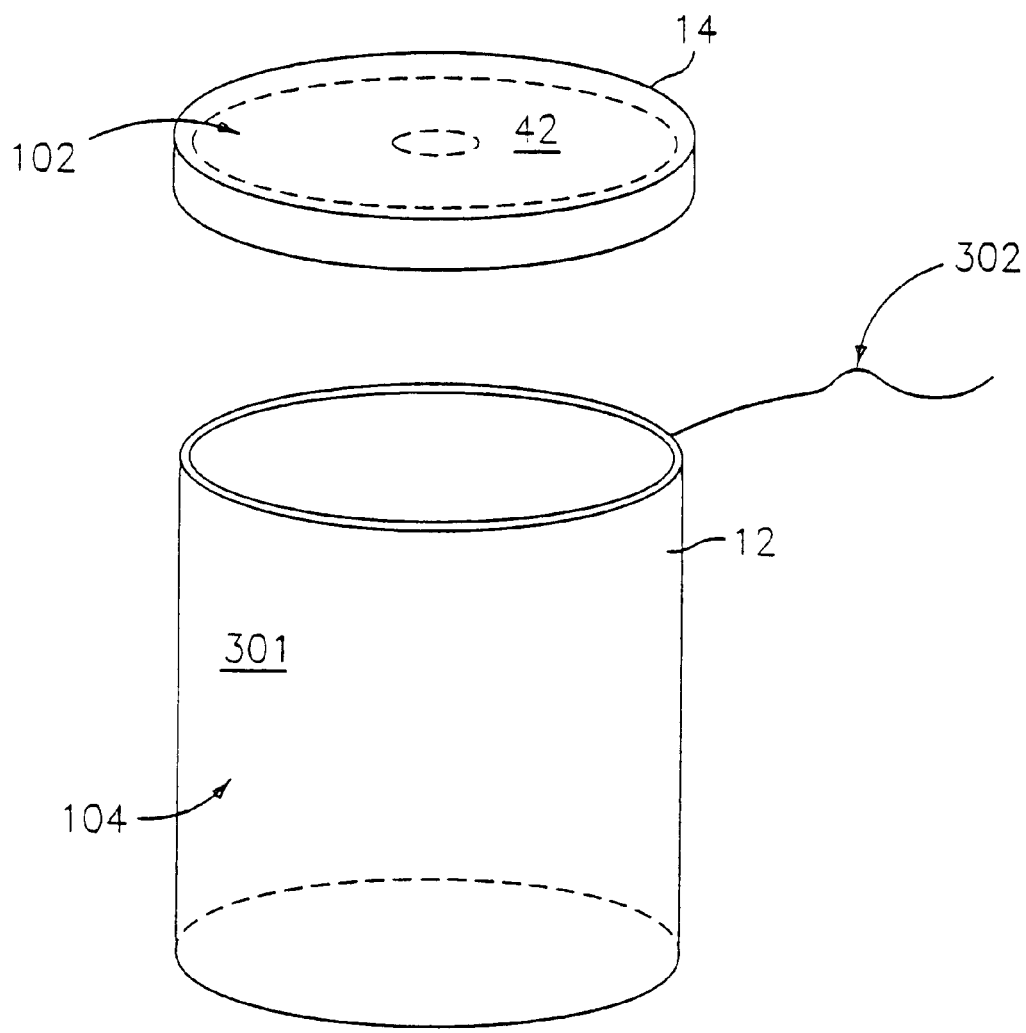
FIG. 15 is an exploded perspective view of a further alternative embodiment of the novel disc packaging device of the present invention in which the disk media is sealed within the lid, and the base is separately sealed, and the lid and base are detachably joined together by an outer packaging skin that can be severed with a pull string.

FIG. 15 shows a further alternative embodiment wherein the disc shaped media is mounted and sealed within cover 14, e.g., as taught herein in connection with other embodiments, and cover 14 is attached to base 12 by paper packaging material skin that binds the cover 14 and base 12 together. Cover 14 is separated from base 12 by pulling string 302 which tears the skin 301 and brakes the circumferential attachment between cover 14 and base 12.

It would be understood that in each embodiment, a container device is provided in which disc shaped media can be packaged, distributed, displayed at retail and, if desired, restored with other materials and that, in effecting such usage, discrete chambers are provided for the disc media and for the other materials so as to prevent contact between the disc media and the other materials. In the embodiments shown in FIGS. 1 through 6B, the inner structure, whether it is the annular collar of FIG. 1, or the discretely positioned abutment/protrusion clips of FIG. 3, or the upstanding rim in FIG. 3B, or the lid and supplemental lid of FIG. 3C, or the "spider" structure of FIG. 4, or the "trap" structure of FIG. 5, in each case is located in and helps define a first chamber in the lower base component 12. Underneath this first chamber is a second chamber. The first chamber receives and securely holds, despite repeated removal and re-packaging, the disc shaped media. The second chamber receives the other materials and keeps these materials separate from the disc shaped media. The need for a separate "jewel case" for the disc shaped media is thus completely eliminated.

It would be understood that the shape of the container can be varied without departing from the scope of the present invention, e.g., the cylindrical base 12 can be square or rectangular so long as the outer wall of the collar 40 corresponds and the collar includes spacers from the outer wall of the collar to the annular ring and annular lip of the present invention. Similar adjustments could be made to the other embodiments as would be apparent to those skilled in the an having reviewed this disclosure. The abutment/protrusions clips of FIG. 3 could be mounted on a non-cylindrical shaped base, as could the spider structure of FIG. 4 or the trap structure of FIG. 5.

It would be understood by those skilled in the art that the function of the annular ring of FIG. 1 or the abutments of FIG. 2 could be performed by an appropriately dimensioned inner wall 26 of the container 12.

It would be further understood that while several methods of attaching the annular collar of FIG. 1, the abutment/protrusion clips of FIG. 2, the spider structure of FIG. 3 and the trap structure of FIG. 4 have been shown, those skilled in the alt after having reviewed this disclosure could devise other means of attachment without departing from the scope of the present invention.

It would be further understood by those skilled in the art that the device and method of this invention can accommodate one or more disc shaped media, e.g., through the insertion of protective elements therebetween.

Illustrated in FIGS. 16–19 is another embodiment of the present invention comprising a basket-type member 400 including a columnar upper portion 402 and a lower portion 404, said lower portion 404 being adapted to receive and retain materials other than a disc-shaped media 42. The basket-type member 400 is adapted to be slidably inserted within an elongated container 406 and thereafter secured within said container 406 by means of a cover 408. It should be appreciated that, since the basket-type container 400 is meant to be inserted within the elongated container 406, the outer diameter of the lower portion 404 of the basket-type member 400 must necessarily be less than the diameter of the opening 410 into the chamber 412 defined by container 400. In the preferred embodiment, the outer diameter of the lower portion 404 of the basket-type member 400 is only slightly less than the diameter of the opening 410 and chamber 412 such that the basket-type member 400 is in frictional contact with the inner walls of the container 406, thereby preventing the basket-type member 400 from shifting within the chamber 412, from causing rattling and from potentially damaging any items stored therein.

It should be appreciated that the height of basket-type member 400 must be less than the height of the container 406 such that the cover 408 may fit flush against the rim 413 of the container 406. Of course, since chamber 412 may be used to store materials other than the disc-shaped media 42, in actual use, the basket-type member 400 may sit in container 406 with the cover 408 removed, on top of said other materials stored in the chamber first, i.e., underneath the basket member 400, in a manner not shown but readily apparent to those skilled in the art, thereby raising the height of the basket-type member 400 above the rim 413 of the container 406. In such event, if it is desired for any reason, e.g., transport, to close container 406 with cover 408, enough of said other materials will need to be removed so as to lower the basket-type member 400 below the level of the rim 413, so that the cover 408 may be secured to the container 406. Furthermore, since the lower portion 404 of the basket-type container 400 may also be used to store other materials, it should be appreciated that said other materials stored in said lower portion may not rise above the level of the rim 413 when the basket-type container 400 is inserted within the container 406 if it is desired to close container 406 with cover 408.

A center support structure 414 is provided for receiving and retaining the disc-shaped media 42. Said support structure 414 includes at least one support projection 416 adapted to be inserted within the central annular aperture of the disc-shaped media 42 such that the disc-shaped media 42 is prevented from moving linearly either perpendicularly or parallel to the plane of the disc-shaped media 42, while allowing the disc-shaped media 42 to rotate around the support structure 414. The support structure 414 may be located either as shown in the preferred embodiment, at the top of the columnar upper portion 402, or on the inner surface of the cover 408.

In the preferred embodiment, the support projection 416 includes at least one protrusion 418, which further acts to retain and support the disc-shaped 42 upon the support structure 414. Said protrusion 418 extends the effective diameter of the support structure 414 slightly larger than that of the aperture in the disc-shaped media 42 such that the disc-shaped media 42 must be snapped into place over the protrusion 418 onto the support projection 416. Once in place, the protrusion 418 serves to prevent the disc-shaped media from falling off the support projection 416. In order to remove it, the disc-shaped media 42 must thereafter be snapped back over the protrusion 418. Given the function of said projection 416 and protrusion 418, in the preferred embodiment, such structures are composed of an elastic material such as plastic that is capable of deforming to thus avoid damage to the disc-shaped media aperture.

Figure 16:
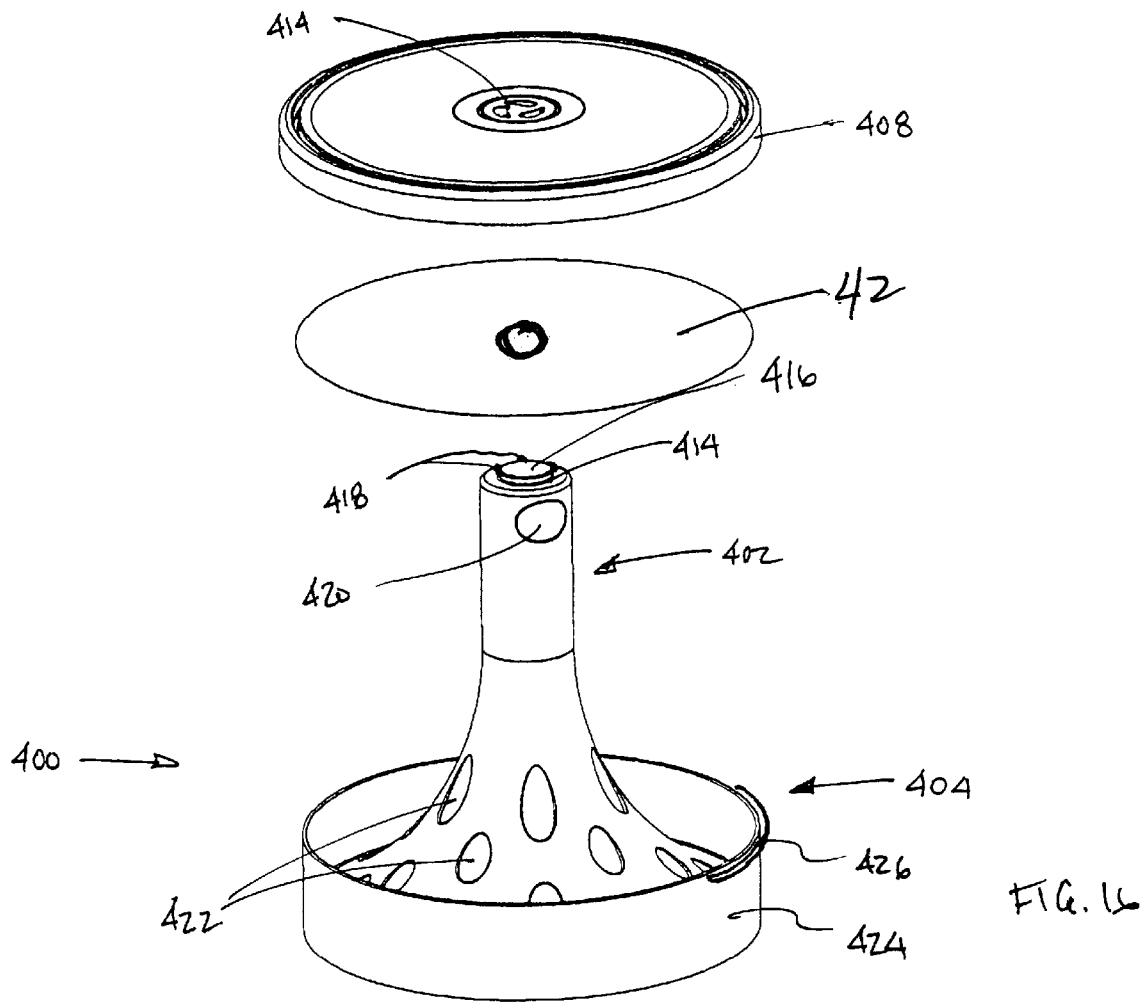
FIG. 16 is an exploded perspective view of another embodiment of the novel disc packaging device of the present invention which includes a first basket-type member that is inserted into the container, which basket-type member includes means for receiving and retaining other materials.
Figure 17:
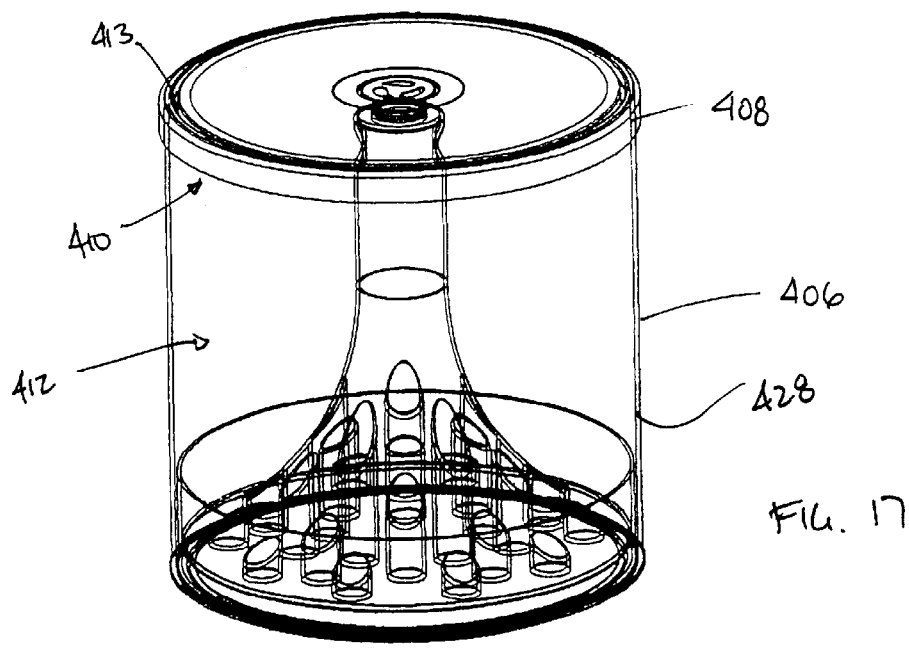
FIG. 17 is a perspective view of the embodiment of FIG. 16.
Figure 18:
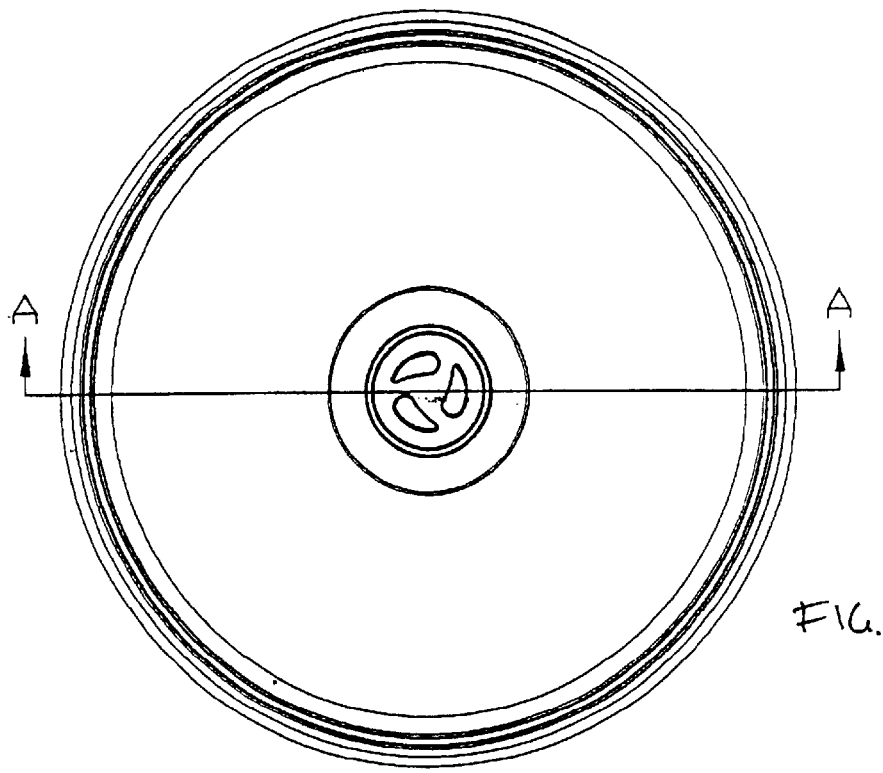
FIG. 18 is atop elevational view of the embodiment of FIG. 16.
Figure 19:
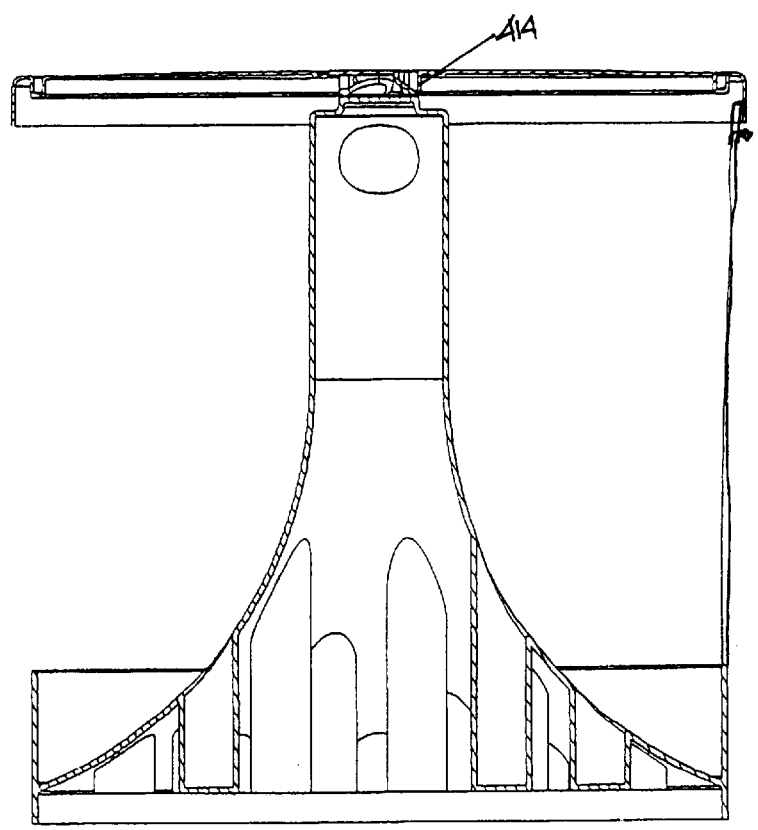
FIG. 19 is a cut-away, cross-sectional view of the embodiment of FIG. 16 along line A—A.

A means for grasping 420 may be provided on the basket-shaped member 400 in order to facilitate the removal of the basket-shaped member 400 from the container 406. Said means for grasping may consist of a finger-shaped opening within the columnar upper portion 402, as shown in FIG. 16, or alternatively, may consist of a handle or strap.

Disposed about the lower portion 404 of the basket-type member 400 are a plurality of receptacles 422 (in the embodiment shown in FIGS. 16–19 they are shafts) adapted to receive and retain items such as pencils, pens, markers, crayons and the like. Said receptacles 422 are situated about the lower portion 404, which, in the preferred embodiment, has a parabolic cross section, but which may be of any size or shape, such that the dimensions of the receptacles 422 vary depending upon their distance from the central vertical axis of the lower portion 404. The smaller receptacles 422 might be more appropriate to store smaller objects such as crayons or erasers, while the larger receptacles 422 would be ideally suited for larger objects such as pencils and rulers.

The lower portion 404 may also include a vertical annular retaining wall 424 at the base thereof, which retaining wall 424 serves to retain other materials stored within the basket-type member 400 and to prevent said materials from spilling out into the chamber 412 of the container 406. The height of the retaining wall 424 is only limited by the height of the basket-type member 400. In fact, if the height of the retaining wall 424 were made as high as the support projection 416 at the top of the columnar upper portion 402, the retaining wall 424 could also serve to protect the disc-shaped media 42. In such example, the retaining wall 424 may also include an outwardly extending lip 426, which lip 426 is adapted to engage the rim 413 of the container 406 so as to prevent the basket-type member 400 from being inserted too far into the chamber 412. It should be appreciated, however, that such lip 426 must not extend beyond the rim 413 of the container 406 so as to ensure flush contact between the cover 408 and the lip 426 and container 406 when the cover 408 is attached.

The retaining wall 424 can be designed so as to perform the added function of stiffening the base of container 412 if the item is, for example, to be shipped in the mail. In such alternative embodiment, the cover 408 can also take the form of a shipping plug.

In a still further iteration, the side wall 428 of the container 406 can be removable and discardable, such that cover 408 and then side wall 428 are removed and the user is left with the basket 404. By way of example, a carousel of tools (or game pieces, dolls, seasons, etc.), accessible with or without removing the disc 42 from the column 402.

As discussed, the height of the basket-type member 400 is limited by the height of the container 406. However, the height of the basket-type member 400 may also be very short. In fact, the only limitation as to such height is that the basket-type member 400 must be sufficiently tall so as to accept and protect the media side of the disc-shaped media 42 on the column 402 from items placed in the basket 400. Thus, a shallow basket-type member 400 including a lip 426 may be used to receive and retain the disc-shaped media 42 on the column 402 justaposed above small items in the basket itself, thereby freeing up most of the chamber 412 for the storage of other materials beneath the basket 400.

The novel packaging device shown in FIGS. 16–19, when combined with a cylindrical container, is particularly well suited as a storage container for a disc media and related material, such as children's arts and crafts implements and a related CD ROM. After use, the building arts and crafts implements can be easily deposited in the basket-type member 400, the CD ROM re-mounted on the support structure 414, the basket-type member 400 inserted into the container 406 and the cover 408 attached to the container 406 to seal the chamber 412. In this manner, the packaging device makes an effective and attractive storage container that can be maintained on shelves in children's rooms. Similar use with other items in the kitchen, the office, the family room, the workroom, etc. is envisioned.

Having thus described the invention with particular reference to the preferred forms thereof, it will be obvious that various changes and modifications can be made therein without departing from the spirit and scope of the present invention as defined by the appended claims.

What is claimed is:

1. An elongated packaging device for packaging at least one disc-shaped recording media, said device comprising:

a first member including means for storing at least one item other than said disc-shaped recording media;

a second member having a chamber and an opening for providing access into said chamber, wherein said first member is adapted to be removably inserted into said chamber of said second member through said opening;

a lid adapted to be removably attached to said second member about said opening to thereby cover said opening and close said chamber; and means for supporting and protecting said recording media within said chamber against lineal movement in either the plane of the recording media or perpendicular to the plane of the recording media, while simultaneously allowing the recording media to rotate about the axis perpendicular to the plane of said recording media.

2. The packaging device of claim 1, wherein said first member includes an upper portion and a lower portion, said upper portion comprising an elongated column and said lower portion comprising a basket-like member adapted to receive and retain said at least one item other than said disc-shaped media.

3. The packaging device of claim 2, wherein said means for supporting and protecting said recording media is mounted on said upper portion of said first member.

4. The packaging device of claim 3, wherein said recording media includes an annular center aperture, and wherein said means for supporting and protecting comprises at least one upstanding surface projection mounted on and extending from said upper portion adapted to be inserted into and engaged within said annular center aperture.

5. The packaging device of claim 4, wherein said at least one upstanding surface projection further includes at least one protrusion adapted to retain said disc-shaped media upon said projection, and wherein said surface projection and said protrusion are flexible to allow insertion and engagement of said recording media.

6. The packaging device of claim 4, wherein said upper portion further includes means to grasp said first member and to extract it from or return it into said chamber of said second member.

7. The packaging device of claim 4, wherein said means for supporting and protecting comprises three upstanding surface projections, and wherein said surface projections are flexible to allow insertion and engagement of said recording media.

8. The packaging device of claim 2, wherein said lower portion further includes a plurality of receptacles, said receptacles being adapted to receive and retain variously sized items.

9. The packaging device of claim 2, wherein said lower portion further includes a vertical retaining wall.

10. The packaging device of claim 9, wherein said lid comprises a shipping plug.

11. The packaging device of claim 9, wherein said second member includes a removable side wall.

12. The packaging device of claim 9, wherein said second member includes a rim defining said opening, and wherein said retaining wall further includes a lip adapted to engage said rim so as to limit the distance said first member may be inserted into said chamber of said second member.

13. The packaging device of claim 12, wherein said second member includes an inner surface and an outer surface, and wherein said lip extends to said outer surface when said first member is inserted within said chamber of said second member such that said lip and said outer surface present a flush surface.

14. The packaging device of claim 1, wherein said means for supporting and protecting said recording media is mounted on said lid, and wherein both said means for supporting and protecting said recording media and said recording media extend into said chamber of said second member when said lid is attached to said first member.

15. The packaging device of claim 14, wherein said lid further includes an interior surface and an exterior surface and said recording media includes an annular center aperture, and wherein said means for supporting and protecting comprises at least one upstanding surface projection mounted on and extending from said interior surface of said lid adapted to be inserted into and engaged within said annular center aperture.

16. The packaging device of claim 15, wherein said first member includes an upper portion and a lower portion, said upper portion comprising an elongated column and said lower portion comprising a basket-like member adapted to receive and retain said at least one item other than said disc-shaped media.

17. The packaging device of claim 16, wherein said upper portion further includes means to grasp said first member and to extract it from or return it into said chamber of said second member.

18. The packaging device of claim 17, wherein said lower portion further includes a plurality of receptacles, said receptacles being adapted to receive and retain variously sized items.

19. The packaging device of claim 18, wherein said lower portion further includes a vertical retaining wall.

20. The packaging device of claim 19, wherein said lid comprises a shipping plug.

21. The packaging device of claim 20, wherein said second member includes a removable side wall.

22. The packaging device of claim 21, wherein said second member includes a rim defining said opening, and wherein said retaining wall further includes a lip adapted to engage said rim so as to limit the distance said first member may be inserted into said chamber of said second member.

23. The packaging device of claim 22, wherein said second member includes an inner surface and an outer surface, and wherein said lip extends to said outer surface when said first member is inserted within said chamber of said second member such that said lip and said outer surface present a flush surface.

24. The packaging device of claim 1, wherein said lid includes a downwardly extending lid flange and said second member contains a first rim defining said opening, wherein said lid is removably attached to said first member by means of a compression fit between said lid flange and said first rim.

25. The packaging device of claim 1, wherein said first member and said second member are cylindrical in shape, and wherein the external diameter of said first member is slightly less than the internal diameter of said second opening of said chamber of said second member, and wherein said first member is adapted to be removably inserted into and retained within said chamber of said second member.

26. A method for packaging a disc-shaped media and materials other than said disc-shaped media within a closed packaging device, said method comprising the steps of:
   providing a first member including means for storing at least one item other than said disc-shaped recording media, said first member including upper and lower portions;
   providing a second member having a chamber and an opening for providing access into said chamber, wherein said first member is adapted to be removably inserted into said chamber of said second member through said opening;
   providing a lid adapted to be removably attached to said second member about said opening to thereby cover said opening and close said chamber;
   providing means for supporting and protecting said recording media upon the upper portion of said first member against lineal movement in either the plane of the recording media or perpendicular to the plane of the recording media, while simultaneously allowing the recording media to rotate about the axis perpendicular to the plane of said recording media;
   removably attaching said disc-shaped media to said means for supporting and protecting on said first member;
   inserting said materials other than said disc-shaped media within said first member;
   removably sliding said first member into said second member; and
   removably attaching said lid to said second member.

27. A method for packaging a disc-shaped media and materials other than said disc-shaped media within a closed packaging device, said method comprising the steps of:
   providing a first member including means for storing at least one item other than said disc-shaped recording media;

providing a second member having a chamber and an opening for providing access into said chamber, wherein said first member is adapted to be removably inserted into said chamber of said second member through said opening;

providing a lid adapted to be removably attached to said second member about said opening to thereby cover said opening and close said chamber;

providing means for supporting and protecting said recording media within said lid against lineal movement in either the plane of the recording media or perpendicular to the plane of the recording media, while simultaneously allowing the recording media to rotate about the axis perpendicular to the plane of said recording media;

removably attaching said disc-shaped media to said means for supporting and protecting in said lid;

inserting said materials other than said disc-shaped media within said first member;

removably sliding said first member into said second member; and removably attaching said lid to said second member.

28. A method for packaging a disc-shaped media and materials other than said disc-shaped media within a closed packaging device, said method comprising the steps of:

providing a first member including means for storing at least one item other than said disc-shaped recording media, said first member including upper and lower portions;

providing a second member having a chamber and an opening for providing access into said chamber, wherein said first member is adapted to be removably inserted into said chamber of said second member through said opening;

providing a shipping plug adapted to be removably attached to said second member about said opening to thereby cover said opening and close said chamber;

providing means for supporting and protecting said recording media within said shipping plug against lineal movement in either the plane of the recording media or perpendicular to the plane of the recording media, while simultaneously allowing the recording media to rotate about the axis perpendicular to the plane of said recording media;

removably attaching said disc-shaped media to said means for supporting and protecting in said shipping plug;

inserting said materials other than said disc-shaped media within said first member;

removably sliding said first member into said second member; and removably attaching said shipping plug to said second member.

* * * * *